(12) United States Patent
Kreyenborg et al.

(10) Patent No.: US 7,516,579 B2
(45) Date of Patent: Apr. 14, 2009

(54) PLATE HOLDING DEVICE FIXED TO A SUBSTRUCTURE

(75) Inventors: Ralf Kreyenborg, Bad Salzuflen (DE); Rolf Rand, Melle (DE); Thomas Vogler, Bad Salzuflen (DE)

(73) Assignee: Dorma GmbH + Co. KG, Ennepetal (DE)

( * ) Notice: Subject to any disclaimer, the term of this patent is extended or adjusted under 35 U.S.C. 154(b) by 268 days.

(21) Appl. No.: 10/535,793

(22) PCT Filed: Apr. 21, 2004

(86) PCT No.: PCT/EP2004/004215

§ 371 (c)(1),
(2), (4) Date: Feb. 16, 2006

(87) PCT Pub. No.: WO2004/094749

PCT Pub. Date: Nov. 4, 2004

(65) Prior Publication Data

US 2006/0141278 A1  Jun. 29, 2006

(30) Foreign Application Priority Data

Apr. 22, 2003  (DE) .................. 103 18 276

(51) Int. Cl.
*E04B 2/82* (2006.01)
(52) U.S. Cl. ................. 52/126.1; 52/126.4; 248/354.3; 403/48; 254/98; 254/89 H; 254/134
(58) Field of Classification Search .............. 52/126.1, 52/126.4, 126.6, 126.7, 263, 239, 137, 136, 52/235; 248/354.3, 500; 403/48, 45, 46, 403/118; 254/98, 89 H, 93 H, 134
See application file for complete search history.

(56) References Cited

U.S. PATENT DOCUMENTS

| | | | | | |
|---|---|---|---|---|---|
| 2,617,620 | A | * | 11/1952 | Jessop ........................ | 254/98 |
| 3,318,057 | A | * | 5/1967 | Norsworthy ............... | 52/126.6 |
| 3,377,755 | A | * | 4/1968 | Stucky et al. .............. | 52/79.13 |
| 3,398,933 | A | * | 8/1968 | Haroldson ................... | 254/98 |
| 4,558,544 | A | * | 12/1985 | Albrecht et al. ............ | 52/126.6 |
| 4,926,593 | A | * | 5/1990 | Johnston .................... | 52/126.4 |
| 5,970,665 | A | * | 10/1999 | Oudman .................... | 52/126.6 |
| 6,490,828 | B1 | * | 12/2002 | Fuller et al. ................. | 52/36.1 |

FOREIGN PATENT DOCUMENTS

| | | |
|---|---|---|
| CH | 684 491 | 9/1994 |
| FR | 2 624 495 | 6/1989 |
| GB | 2 333 568 | 7/1999 |
| GB | 2 378 457 | 2/2003 |

* cited by examiner

*Primary Examiner*—Richard E Chilcot, Jr.
*Assistant Examiner*—Anthony N Bartosik
(74) *Attorney, Agent, or Firm*—Cohen Pontani Lieberman & Pavane LLP

(57) ABSTRACT

The invention is directed to a holder for fixedly attaching a panel to a substructure. The holder comprises a connection member capable of being fixedly connected non-rotatably to the substructure, a panel holder fixedly attached to the panel and a spacer element threadedly attaching the connection member to the panel holder. The spacer element can be axially adjusted and fixed relative to the connection member and the panel holder.

11 Claims, 2 Drawing Sheets

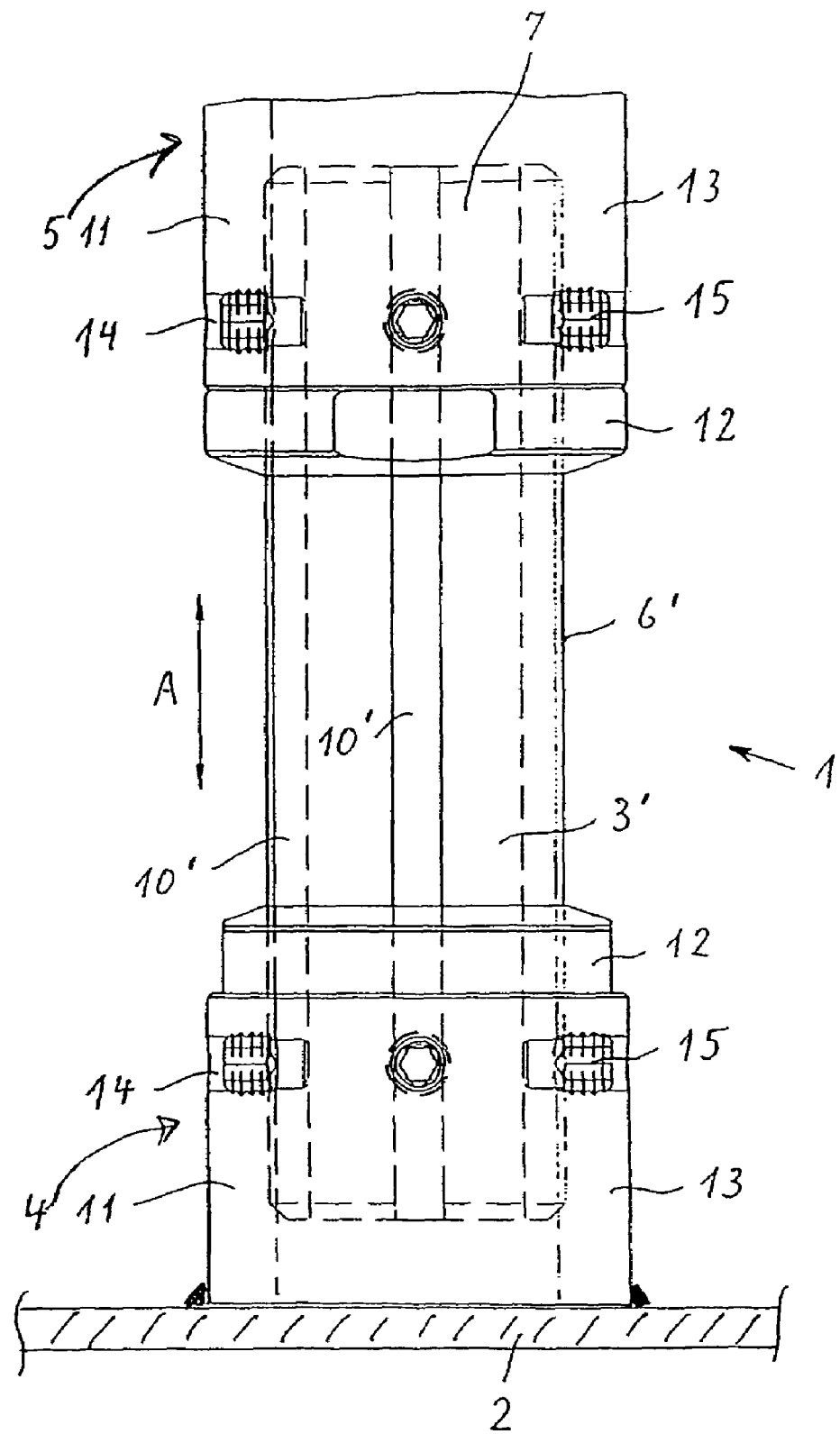

PLATE HOLDING DEVICE FIXED TO A SUBSTRUCTURE

PRIORITY CLAIM

This is a U.S. national stage of application No. PCT/EP2004/004215, filed on 21 Apr. 2004. Priority under 35 U.S.C. §119(a) and 35 U.S.C. §365(b) is claimed from German Application No. 103 18 276.4, filed 22 Apr. 2003.

BACKGROUND OF THE INVENTION

1. Field of the Invention

The invention is directed to a holder for plates or panels that is fastened to an underlying construction or substructure and comprises a connection member which is connected to the substructure so as to be fixed with respect to rotation relative to it and which has a connection thread for connecting to a spacer element which spaces the panel relative to the substructure and which has a connection thread at its end facing the panel for connecting to a panel holder.

2. Description of the Related Art

Holders of the type mentioned above must be able to connect to a substructure so as to be fixed with respect to rotation relative to it on one side and to connect to a glass panel or the like on the other side. In order to compensate for construction tolerances, it is desirable that the holder is constructed such that its length is changeable, i.e., structural component parts of the holder must be designed in such a way that the distance between the connection of the holder to the substructure and to the glass panel or façade panel can be adjusted and fixed in order to enable an aligned arrangement of adjoining glass panels or façade panels. As a rule, a spacer element which forms a component part of the holder is used for this purpose.

DE 195 28 489 A1 describes a device of the generic type. The previously known glass pane holder is provided with a threaded bolt that is welded to a support and engages with a receiving sleeve forming the spacer element. The threaded rod of a panel holder can be screwed into the cup-shaped head of the receiving sleeve. The depth to which the threaded rod can be screwed into the receiving sleeve is determined by the contact of a supporting disk of the panel holder at the receiving sleeve, i.e., the threaded rod and cup-shaped head of the receiving sleeve are not suited for spacing the glass pane relative to the support.

DE 93 18 862 U1 discloses a holder for multiple-insulation glass panes in which a mounting bolt that makes it possible to compensate for tolerances can be screwed into a mounting sleeve and secured therein. In this case, also, spacing between the glass pane and the substructure is made possible by only one individual screw connection.

This applies, as well, to the solution according to DE 195 19 526 A1 for the panel holder in which the shaft part of a support element engages in a fixed structural component part, designated as a building, at its end remote of an articulated head.

In the clamping fitting for fastening glass panes disclosed in DE 197 13 038 C2, a point holder which is clamped into the glass pane is connected to a wall by means of a clamping screw. The required spacing is carried out by a spacer nut which is screwed to an adjusting nut and by means of which the distance between the wall and the glass pane can be adjusted with the intermediary of a spacer bushing. DE 196 23 797 A1 discloses a holder for a glass pane in which a point holder is supported at a supporting framework by a support member. The support member penetrates a bore hole of the supporting framework by a threaded pin and can be secured to the supporting framework on both sides of this bore hole by means of lock nuts.

In each of the above-mentioned connections between a panel and a substructure, only an individual adjusting member is provided for changing the spacing between the panel and the substructure.

SUMMARY OF THE INVENTION

It is the object of the invention to provide a holder for the connection of glass panels, façade panels, or the like, to a substructure, by means of which holder the distance between the substructure and the panel can be adjusted and fixed in a simple manner. This holder must ensure the possibility of a large change in spacing combined with the possibility of an optimal alignment. The connection of the holder to the glass panel or façade panel can be carried out in any manner, e.g., in the form of a point holder, by means of a so-called spider, or the like.

This is attained by a holder for panels that is fastened to a substructure and comprises a connection member rotatably fixed to the substructure and having a connection thread for threadedly connecting the connection member. The spacer element spaces a panel relative to the substructure and has a connection thread at its end which faces the panel for connecting to a panel holder so that the spacer element can be axially adjusted and fixed relative to the connection member and relative to the panel holder.

Due to the ability of the spacer element to be adjusted relative to the connection member as well as relative to the panel holder, the possible adjusting path is doubled while retaining the same structural length of the spacer element as that in the prior art and ensuring a precise alignment.

The same structural component parts can be used for the connection member and the panel holder in that the structural component parts of the connection member connected to the spacer element and the structural component parts of the panel holder at the spacer element are arranged in a mirror-symmetric manner. A symmetric construction of the spacer element and, therefore, a simple and economical manufacture is made possible in that identical threaded pins are provided at the end of the spacer element facing the substructure and at the end of the spacer element facing the panel.

The grooves which extend at the spacer element in axial direction thereof and which intersect the connection thread of the threaded pin serve to fix the spacer element with respect to rotation relative to the connection member and relative to the panel holder in a manner to be described in the following. Each threaded pin of the spacer element preferably has four diametrically arranged grooves.

The connection member and the panel holder are constructed by a simple technique in a further development of the invention in that the connection member and the panel holder are formed as nuts which engage the connection thread of the spacer element in a sleeve-shaped manner, these nuts being fixed with respect to axial displacement by means of associated lock nuts.

While the above-mentioned lock nuts prevent a possible axial displacement of the connection member and panel holder, the latter are also fixed with respect to rotation in that threaded bore holes for receiving grub screws which can be screwed into the above-described grooves of the threaded pins are arranged in the wall of the nuts. A grub screw can be screwed into each of the four grooves of a threaded pin. As an advantageous result, the alignment can be exactly adjusted because locking is made possible between the spacer element on one side and the connection member and panel holder on the other side by rotating the connection member or the panel holder along one fourth of its circumference.

This precision alignment can be improved in a further development of the invention in that the connection threads of the connection member and of the panel holder are constructed as fine threads.

The connection thread of the connection member and of the panel holder can be constructed as same-handed threads or opposite-handed threads, as desired. In the latter case, the connection member and the panel holder can both be displaced axially simultaneously relative to the spacer element by rotating the spacer element.

As was described above, the structural component parts of the connection member and of the panel holder are arranged at the spacer element in a mirror-symmetrical manner. This applies with respect to the structural component parts used for axial adjustment and, accordingly, for alignment. Moreover, in a further development of the invention, the panel holder can form the indirect or direct connection for a point holder of a glass panel or façade panel, i.e., it can be constructed in any desired manner with respect to the possibility for connecting to a panel, a so-called spider, or the like.

For functionally correct actuation of the holder described above, the connection member must be connected to the substructure so as to be fixed with respect to rotation relative to it. This rotationally locking connection can be carried out by means of a detachable screw connection in principle. However, the connection between the connection member and the substructure is preferably effected by welding.

According to another feature of the invention, the threaded pin arranged at the spacer element is omitted and manufacture can be further simplified in that the spacer element can be constructed in practice as a threaded bolt and can have, along the entire length of its longitudinal extension, a connection thread and grooves which intersect the connection thread.

The invention will be described more fully in the following with reference to two embodiment examples.

BRIEF DESCRIPTION OF THE DRAWINGS

FIG. 2 shows the holder using a threaded bolt.

DETAILED DESCRIPTION OF THE PRESENTLY PREFERRED EMBODIMENTS

Figure 1:
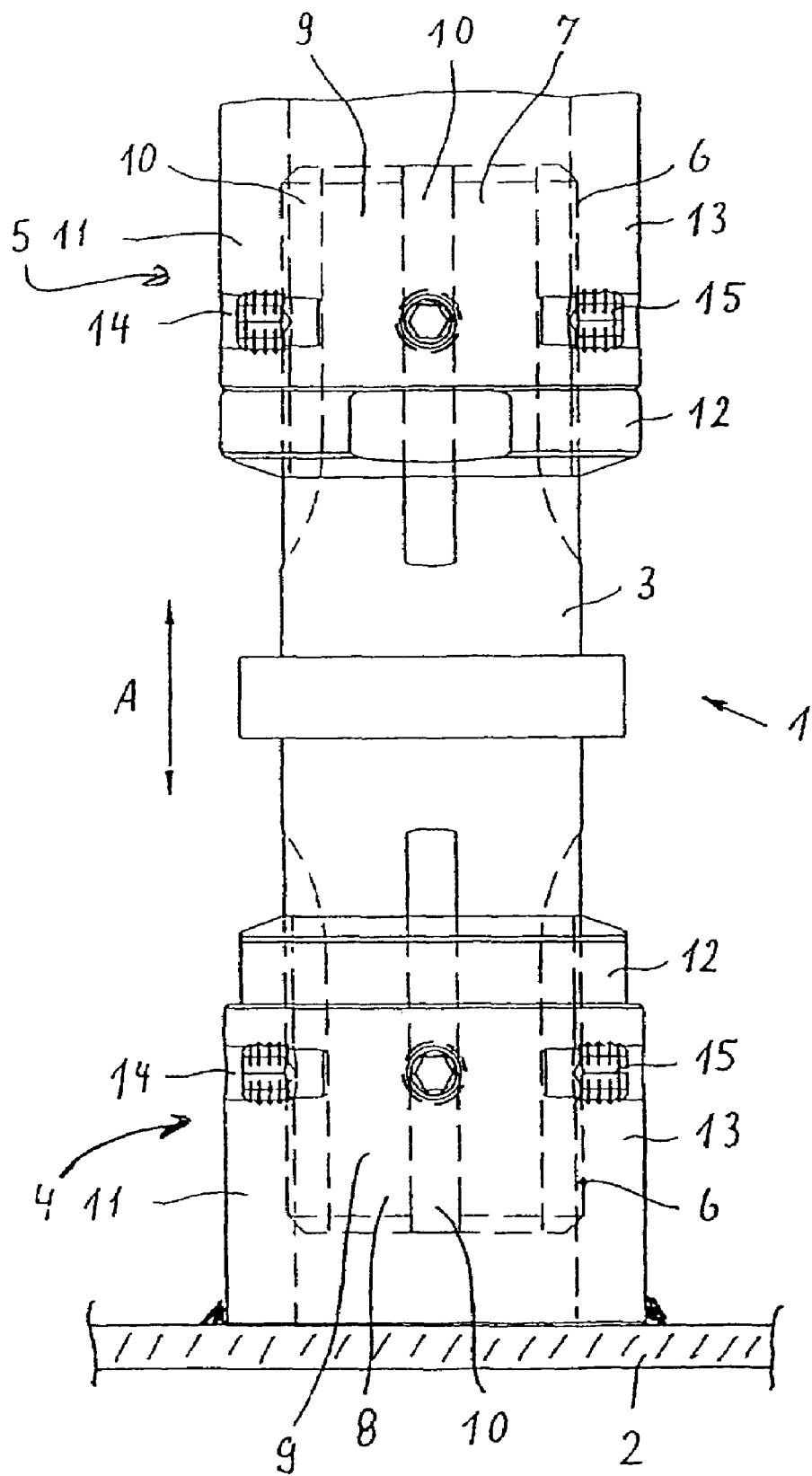
FIG. 1 shows the holder using threaded pins.

Identical structural component parts are provided with the same reference numbers in FIGS. 1 and 2.

A holder 1 according to FIG. 1 includes a one-piece spacer element 3 which has threaded pins 9 at its two ends. The lower threaded pin 9 with reference to the image plane is screwed by means of a connection thread 6 to a connection member 4 that is welded to a substructure 2. The upper threaded pin 9 with reference to the image plane is screwed to a panel holder 5 in a corresponding manner by means of a threaded connection 6. It can be seen that the threaded pin 9 is arranged at the end 7 of the spacer element 3 facing the panel (not shown) and at the end 8 of the spacer element 3 facing the substructure 2. Grooves 10 extending in axial direction A are arranged symmetrically with respect to the spacer element 3 in the area of the threaded pin 9 and a grub screw 15, which can be screwed into these grooves 10, prevents rotation of the threaded pins 9. The grub screws 15 penetrate threaded bore holes 14 in a connection member 4 and panel holder 5 constructed as nuts 11. It can be seen that four diametrically opposed grooves 10 are provided. The axial fixing between the spacer element 3 on one hand and the connection member 4 and panel holder 5 on the other hand is carried out by means of lock nuts 12 which can be tightened against the connection member 4 and the panel holder 5.

The embodiment example according to FIG. 2 differs from the embodiment example according to FIG. 1 only in that a spacer element, designated by 3', is formed as a threaded bolt and grooves, designated by 10', and the connection thread 6' extend along the entire length of the spacer element 3'.

What is claimed is:

1. A holder for coupling a panel to a substructure, the holder comprising:
    a connection member adapted to be fixed to the substructure, the connection member having an internally threaded central bore and a surrounding wall with at least one threaded hole extending transversely to the central bore;
    a panel holder arranged mirror-symmetrically with respect to the connection member at a distance from the connection member, the panel holder having an internally threaded central bore and a surrounding wall with at least one threaded hole extending transversely to the central bore; and
    a one-piece spacer element comprising a pair of threaded pins having a common axis, the threaded pins being received in respective said central bores so that the distance between the connection member and the panel holder is adjustable, each said threaded pin having at least one surface groove extending parallel to the axis,
    whereby said threaded holes and respective said surface grooves are adapted to receive grub screws to fix said spacer element with respect to said connection member and said panel holder.

2. The holder of claim 1 wherein each of said pins has two pairs of diametrically opposed surface grooves extending parallel to said axis.

3. The holder of claim 2 wherein each of said surrounding walls has two pairs of diametrically opposed threaded holes.

4. The holder of claim 1 further comprising a lock nut received on each of said threaded pins, whereby said lock nuts tightened against the connection member and the panel holder.

5. The holder of claim 1 further comprising grub screws received in respective said threaded holes.

6. The holder of claim 1 wherein the central bores have fine threads.

7. The holder of claim 1 wherein the central bores have oppositely handed threads.

8. The holder of claim 1 wherein the central bores have same-handed threads, the spacer element having a continuous thread extending from one threaded pin to the other threaded pin.

9. The holder of claim 8 wherein the spacer element has at least one said surface groove extending from one threaded pin to the other threaded pin.

10. The holder of claim 1 wherein the connection member is welded to the substructure.

11. The holder of claim 1 wherein the panel holder forms a connection for a point holder of the panel.

\* \* \* \* \*